J. S. Royce,
Mower
Nº 30,933.   Patented Dec. 18. 1860.
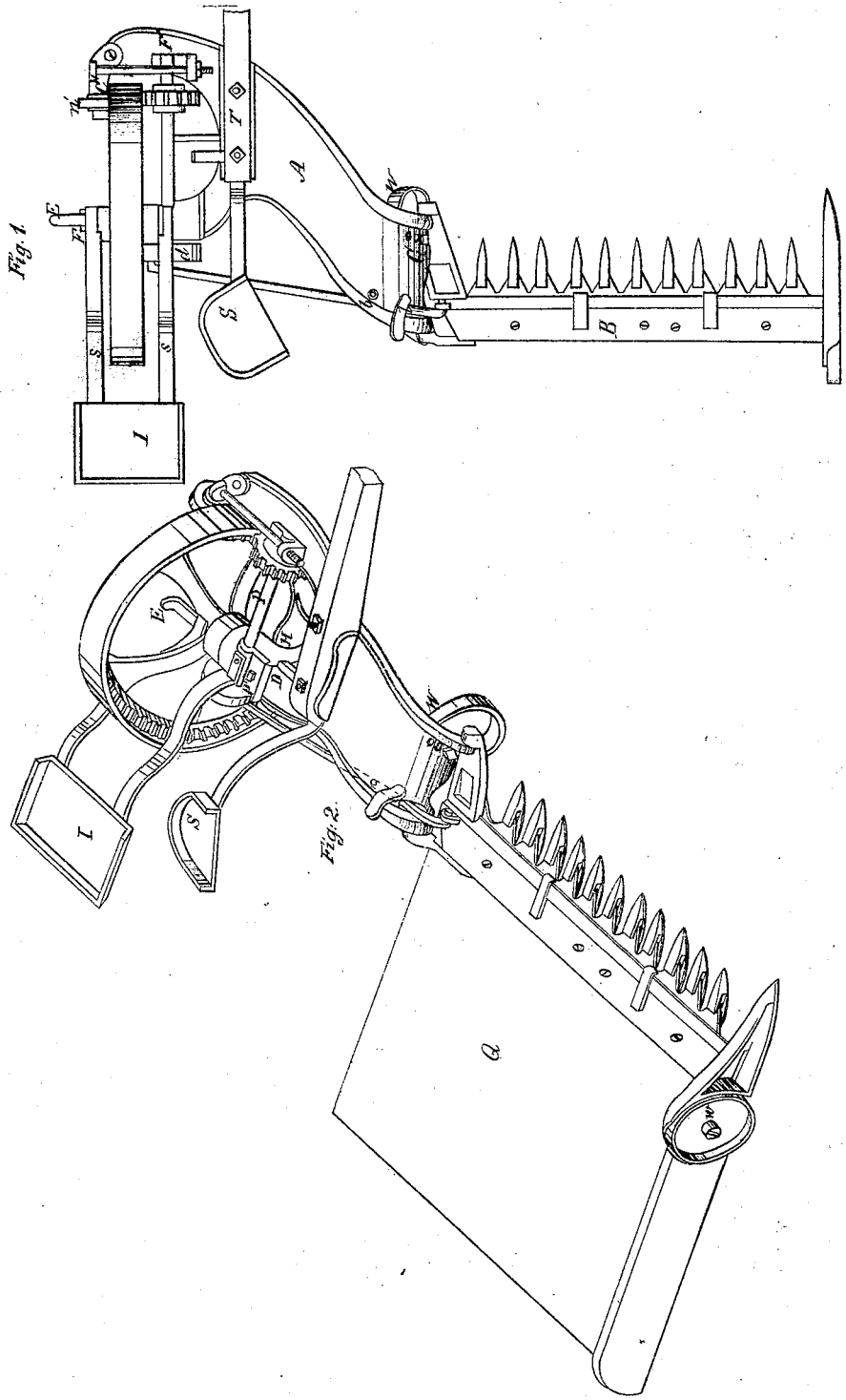

UNITED STATES PATENT OFFICE.

JOHN S. ROYCE, OF CUYLERVILLE, NEW YORK.

IMPROVEMENT IN HARVESTING-MACHINES.

Specification forming part of Letters Patent No. 30,933, dated December 18, 1860.

*To all whom it may concern:*

Be it known that I, JOHN S. ROYCE, of the village of Cuylerville, in Livingston county, and State of New York, have invented certain new and useful Improvements in Harvesting-Machines Adapted to Harvesting all Kinds of Small Grain and Grasses, and as it is peculiarly adapted to harvesting grasses, I call it the "Genesee Valley Mower;" and I hereby declare that the following is a full and exact description thereof, reference being had to the accompanying drawings, making a part of this specification.

Figure 1 represents a view in perspective of a machine containing my improvements. Fig. 2 represents a top or plan view of it when arranged as a harvester of grass.

In the invention of my improvements I have sought to accommodate it to the pecuniary means and to the wants of all farmers, and I have sought for this purpose to produce a combined reaper and mower that should be simple in construction, cheap in price, and durable and serviceable, and while it is not liable to be damaged, it would in such a case be cheaply repaired, and my invention therefore relates to these points.

That others skilled in the art may make and use my invention, I proceed to state the manner of its construction and the principle of its operation.

It has a bed or frame of cast-iron, marked A in the drawings, which may be nearly in the form shown therein, and which is curved downwardly from the point on it at which the tongue T is attached to it to near the ground, at which end the cutting apparatus B is attached to it by a flexible joint at C, when the inner shoe of the cutting apparatus is hinged to it in such a manner as will permit an upward inclination of the cutting apparatus without impeding the successful working of the same, and as will permit the folding of the cutting apparatus up by the frame A, for transportation or for storage, and so as to allow the machine, with the cutting apparatus folded, to pass through narrow openings.

The outer end of the cutting apparatus is borne on a wheel, (shown in the drawings,) which is placed in a recess in the outer shoe or divider of the same when the machine is arranged as a mower, and is marked $w$ in Fig. 2, and the inner end of the bed or frame is supported on a wheel of beveled periphery, and marked W in the drawings, which, in the connection of the frame with the cutting apparatus, also sustains the cutting apparatus, and the said wheel is so placed as to have its periphery in front of the front end of the inner shoe of the cutting apparatus, and, while the bottom of it is so arranged as to permit it to slide easily over the ground, is carried up in front of the frame only so far as to to be firmly hinged to the frame through its front end. I use a wheel instead of a shoe to sustain the lower end of the frame and the cutting apparatus, because from the peculiar character of its motion it prevents the evil of the accumulation of considerable quantities of green new-mown grass in front of its line of motion by rolling over it, while I find the effect of a long shoe only to be to push forward such grass, when wet and green, until considerable masses of it are accumulated in front of it, which I find to be a great evil, especially when the cutting apparatus of a mower is fixed in a rigid position with respect to the driving-wheel or the frame of the machine, as on the occurrence of such a case the whole cutting apparatus is necessarily lifted from the ground.

It is obvious that a series of holes for the axle of the wheel W may be substituted by a slot and a set-screw without a departure from the principle of my invention.

The frame or bed A arches out in projections from a line when the tongue T rests upon it, and the rear one is cast round on its outer end for the axle of the single driving-wheel of the machine, and which is marked D in the drawings, and with a box on the part of it inside of the wheel, and where it is cast square for the rear end of the pinion or pitman-shaft P, which box is covered by the metallic plate P', and the said axle is cast square outside of the hub of the driving-wheel, to receive a washer which is extended outwardly from its lower side some six or eight inches, and is turned up at its outer end and forms a rest for the left foot of the driver, and said washer and wheel are kept in position by a nut on the continuation of the axle, which for this purpose is cast round, with a piece or bar of wrought-iron in it. The washer and step are marked in the drawings by the letter E, and the nut is marked by the letter F. The other arched projection of the frame extends out around in front but nearer the periphery of the driving-wheel, and the forward journal of the pinion or pitman-shaft is cast in it, and is marked I, and said arched projection is marked F' in the drawings, and on its outer end is fastened a piece of metal by a swivel-joint, which carries a friction-wheel, which runs against a flange rising from the inner side of the periphery of the driving-wheel. Said cross-piece is marked C' and the friction-wheel is marked w'.

On the inner end of the box for the forward journal of the pinion or pitman-shaft is a metallic plate, standing parallel with said shaft, and having a hole through it, and on the outer side of the piece C' is a similar plate with a similar hole through it, and a metallic rod, r, passes through those holes, and having a head on one end and a screw and nut on the other, by use of which the friction-wheel is kept in any desired relation to the driving-wheel for the purpose of regulating the working of the pinion on the front end of its shaft in the spur-cog wheel that is on the driving-wheel; but the principal object of the arched projection F' and of the other mechanism connected with it is to keep the drive-wheel D in a position at right angles to its axle, so that as it may meet the obstruction of any hard substance in its progress calculated to turn the machine from the line of its draft, and thereby to produce an unusual strain upon its axle, the arched part of the frame, which comes in front of the drive-wheel with the friction-wheel on the part C', may keep it in its exact position on its axle, and thus relieve it from any such strain, and thereby prevent breaking the axle.

The pinion-shaft has a pinion on its forward end, near the forward box for it, which meshes into a spur-wheel around the driving-wheel, near its periphery, which revolves it, and in its revolutions it carries a disk or eccentric on its rear end, which sustains a wrist-pin, to which the pitman-rod is attached, and in its revolution it vibrates the sickle-bar. The disk is marked d, and its front is cast hollow and contains a ratchet and pawl, which are not shown in the drawings, which is kept in position by a spring; but it is so constructed that when the machine is backed they are turned out of gear with the cutting apparatus; and when it is desired to move the machine from place to place, or when it is desired to turn the cutting apparatus up, the pawl and ratchet may be turned out of gear by a key on its rear side, so that the machine may be moved without vibrating the cutting apparatus.

The inner side of the periphery of the driving-wheel is furnished with a metallic rim, t, rising from its inner edge toward the hub of the wheel to the distance of from one and a half to three inches, and extending around the wheel, and over or against this rim is extended a metallic plate, of scallop form on its outer surface, which passes from a point nearly as high on the periphery of the wheel as the hub of it down and around to a similar height in rear, and embraces the rim t by metallic arms on its inner surface, or by other suitable device, so as to keep it close to the said rim, and the said plate is kept in position by any suitable arms or braces from it to suitable places of attachment for them to the lower side of the frame or bed. This scalloped plate is marked H in the drawings, and is used to protect the internal spur-wheel from becoming impeded in its action by a deposit of mud, sand, or other obstructing matter in it.

A driver's seat, I, which may be of metallic plate, is elevated and sustained on two metallic springs, one of which rises from and is kept in position by a bolt through the left step of the driver, and the other from and is kept in position by the bolt through the cap of the box of the rearward journal of the pinion-shaft, which also keeps said cap in position, and a rest for the right foot of the driver is provided by a piece of metal made fast by a bolt through it, which holds the rear end of the tongue in position. The springs on which the driver's seat is elevated are marked s s.

The machine is converted into a grain-harvester by fastening the platform Q to the finger-bar by bolts through them. Said platform is sustained in position and the cutting apparatus also sufficiently elevated for harvesting grain in the following-described manner: A bar of iron is made fast to the under side of the finger-beam at a suitable distance from its flexible joint by a bolt through both of them, and is carried thence toward the driving-wheel, and it is curved up at the heel of the finger-bar, and a bolt that passes down through the curved part of the frame, and the head of which is marked b in the drawings, passes through a hole in the curved end of the bar, and which is not shown in the drawings, when it is held by a nut on its downward end, and by a wheel under the platform, and which is not shown in the drawings, which is carried in boxes in metallic plates depending from two ribs on the under side of the platform, which run from the front to the rear of the platform. As by the arrangement of the machine for harvesting small grain the wheel W is lifted from the ground, it is removed from the machine, and the outer end of the machine is borne on the platform-wheel just referred to; and, further, to adapt the machine for harvesting small grain, a seat, S, for a raker is erected on a metallic spring, which is made fast at its lower end on the tongue by bolts that hold the tongue in position, and a rest for the left foot of the raker is represented by a piece of metal made fast to the rear edge of the frame at l, while his right foot may rest at intervals against the platform Q. The tongue T is made fast between the upright flanges on the surface of the frame or bed.

In the construction and location of the driver's seat I have endeavored to counterbalance the forward inclination of the machine, occasioned by the position of the weight of the frame with respect to the axle of the driving-wheel, and which is entirely in front of it, and I have therefore so located this seat in my improved machine as so perfectly to counterbalance this forward inclination as to relieve the necks of the team entirely from weights upon them.

In regarding the drawings of this machine it will be perceived that it is constructed of the smallest number of pieces that a machine of this peculiar construction could well be made of, and that the gear-work is exceedingly simple, and that as it is made altogether of metal, except the tongue and platform, it must be durable and serviceable, and from the simplicity of its whole structure it must be cheap, and as every part of it is to be made as light as a due regard to strength will permit, it will also necessarily be lighter in weight than any other machine of this kind that I am acquainted with.

Having thus stated my invention, what I claim therein as new, and desire to secure by Letters Patent, is—

1. The downward-curved arched metallic frame A, constructed as described, in combination with the driving-wheel D, the pinion or pitman-shaft P and its rod, the cutting apparatus, and the wheel W, for the purpose set forth, and substantially as described.

2. The arched projection of the frame F', in combination with the adjustable cross-piece C', and its friction-wheel W', and the rod v, for the purpose set forth, and substantially as described.

In testimony of which invention I hereunto set my hand.

JOHN S. ROYCE.

Witnesses:
W. H. GLEASON,
W. T. CUYLER.